United States Patent [19]
Oda et al.

[11] Patent Number: 5,127,005
[45] Date of Patent: Jun. 30, 1992

[54] FAULT DIAGNOSIS EXPERT SYSTEM

[75] Inventors: Toshihiko Oda, Sagamihara; Eiichi Katoh, Yokohama, both of Japan

[73] Assignee: Ricoh Company, Ltd., Japan

[21] Appl. No.: 584,801

[22] Filed: Sep. 19, 1990

[30] Foreign Application Priority Data

Sep. 22, 1989 [JP] Japan ............... 1-244922

[51] Int. Cl.⁵ ............... G06F 11/00; G01R 31/28
[52] U.S. Cl. ............... 371/15.1; 364/276.3; 364/DIG. 1; 395/575; 395/916
[58] Field of Search ............... 371/15.1; 395/575, 50, 395/51, 52, 916; 364/275.7, 276.3

[56] References Cited

U.S. PATENT DOCUMENTS

| | | | |
|---|---|---|---|
| 4,697,243 | 9/1987 | Moore et al. | 364/513 |
| 4,841,456 | 6/1989 | Hogan, Jr. et al. | 395/916 |
| 4,964,125 | 10/1990 | Kim | 371/15.1 |
| 4,972,453 | 11/1990 | Daniel, III et al. | 371/15.1 |
| 4,985,857 | 1/1991 | Bajpai et al. | 364/551.01 |

OTHER PUBLICATIONS

Wilkinson, Mind: An Inside Look at an Expert System for Electronic Diagnosis, IEEE Design & Test, Aug. 1985, pp. 69-77.

Primary Examiner—Charles E. Atkinson
Attorney, Agent, or Firm—Mason, Fenwick & Lawrence

[57] ABSTRACT

A fault diagnosis expert system for locating and eliminating sources of a machine trouble. The system comprises a storage part for storing an expert knowledge constructed in a hierarchical search tree structure in which cause-to-effect links connecting high-level effect events to low-level cause events are pre-defined and all possible low-level cause events are pre-enumerated for each high-level effect event, a user interface part for providing a user with questions and responses regarding the state of the machine trouble, an inference part for inferring a cause of the machine trouble with the expert knowledge and the user information, and an outputting part for allowing inference results from the inference part to be displayed for the user. The expert knowledge includes a cause candidate criterion pre-defined as an event used for selection of searching paths when the inference part makes a decision as to which path of the search tree should be traced back. The cause-to-effect links include an identifier indicative of a difference between self-dependency causes and other-dependency causes.

13 Claims, 15 Drawing Sheets

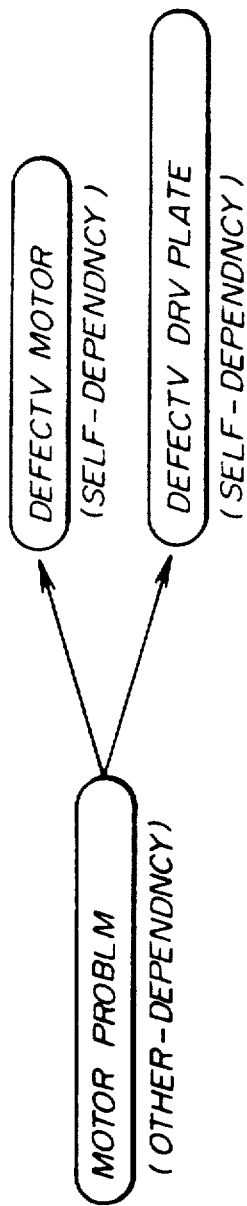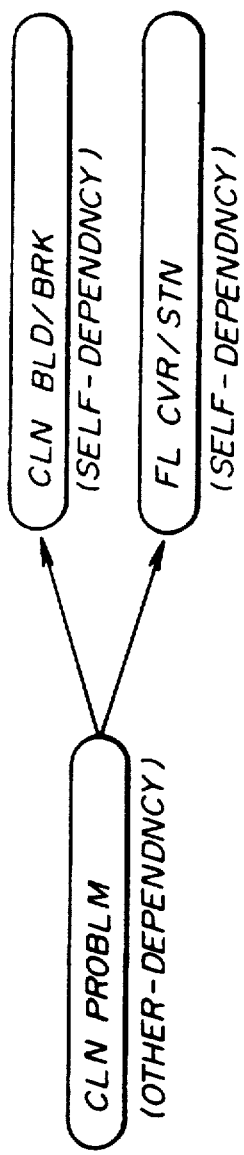
FIG. 7A
FIG. 7B

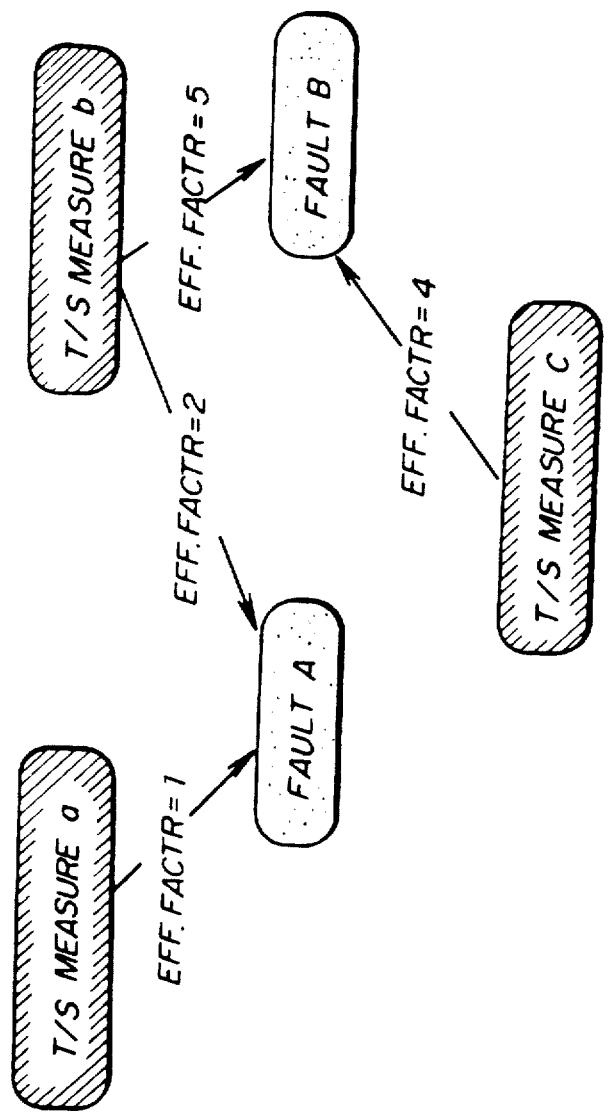

FIG. 10  FRAME 1

F. NAME: V.B. LINE
[LINK]
 VALUE: V.B. LINE → PS BDY/STN
        V.B. LINE → PS BDY/FLW
[REPEATABILITY]
 VALUE: PERIODIC, ALWAYS,
        INITIAL ONLY
[SHAPE]
 VALUE: WAVY, STRAIGHT,
        BAND-LIKE
[LOCATION]
 VALUE: PAWL POSITN,
        ROLLR POSITN, BCKSIDE

FIG. 11  FRAME 2

F. NAME: BG STN
[LINK]
 VALUE: BG STN → PS BDY/STN
        BG STN → FX ROLLR/FLW
[REPEATABILITY]
 VALUE: PERIODIC, ALWAYS,
        INITIAL ONLY
[SHAPE]
 VALUE: V BAND, H BAND, DOTS
[LOCATION]
 VALUE: BCKSIDE, FRTSIDE,
        RR END, OVERALL

FIG. 12  FRAME 3

F. NAME: PS BDY
[LINK]
 VALUE: PS BDY/STN →
        CLN PROBLM
[STATE]
 VALUE: STAIN, FLAW

FIG. 13  FRAME 4

F. NAME: CLN PROBLM
[LINK]
 VALUE: CLN PROBLM →
        CLN BLD/BRK
        CLN PROBLM →
        FL CVR/STN

FIG. 14 FRAME 5

F.NAME : CLN BLD

[LINK ]
VALUE
[STATE]
VALUE : STAIN, BREAK, LIFT

FIG. 15 FRAME 6

F.NAME : FL CVR

[LINK ]
VALUE
[STATE]
VALUE : STAIN, CRACK

FIG. 16 FRAME 7

F.NAME : V.B LINE → PS BDY/STN
[CERTNTY FACTR ] 3
[EFFECT]
 VALUE : V.B LINE, —, —
[CAUSE]
 VALUE : PS BDY, STATE, STAIN
[SUPPRT CONDTN 1]
 VALUE : V.B LINE, REPEATBLTY,
  PERIODIC, POS.WEIGHT : 1,
  NEG. WEIGHT : —1
[SUPPRT CONDTN 2]
 VALUE : V.B LINE, SHAPE, BAND
  POS. WEIGHT : 2, NEG.WEIGHT : —1

FIG. 17 FRAME 8

F.NAME : V.B LINE → PS BDY/FLW
[CERTNTY FACTR ] 2
[EFFECT]
 VALUE : V.B LINE, —, —
[CAUSE ]
 VALUE : PS BDY, STATE, FLAW
[SUPPRT CONDTN 1]
 VALUE : V.B LINE, REPEATBLTY,
  PERIODIC
  POS. WEIGHT : 1, NEG WEIGHT : —1

FIG. 18  FRAME 9

F.NAME: BG STN→PS BDY/STN
[CERTNTY FACTR ] 12
[EFFECT]
  VALUE: BG STAIN, —, —
[CAUSE]
  VALUE: PS BDY, STATE, STAIN

FIG. 19  FRAME 10

F.NAME: BG STN→FIX ROLLR/FLW
[CERTNTY FACTR ] 2
[EFFECT]
  VALUE: BG STAIN, —, —
[CAUSE]
  VALUE: FIX ROLLR, STATE, FLAW

FIG. 20  FRAME 11

F.NAME: FIX ROLLR
[LINK ]
  VALUE:
[STATE ]
  VALUE: STAIN, FLAW

FIG. 21  FRAME 12

F.NAME: PS BDY/STN→CLN PROBLM
[CERTNTY FACTR ] 0
[EFFECT]
  VALUE: PS BDY, STATE, STAIN
[CAUSE]
  VALUE: CLN PROBLM, —, —

FIG. 22
FRAME 13

```
F.NAME : CLN PROBLM →
                    CLN BLD/BRK
[CERTNTY FACTOR] 1
[EFFECT]
   VALUE: CLN PROBLM, —, —
[CAUSE]
   VALUE: CLN BLD, STATE, BREAK
[CANDIDT CRITER]
   VALUE: V.B. LINE, —, —
```

FIG. 23
FRAME 14

```
F.NAME : CLN PROBLM →
                    FL CVR/STN
[CERTNTY FACTOR] 3
[EFFECT]
   VALUE: CLN PROBLM, —, —
[CAUSE]
   VALUE: FL CVR, STATE, STAIN
[CANDIDT CRITER]
   VALUE: V.B. LINE, —, —
          BG STAIN, —, —
```

FIG. 25

| FAULTS OBSERVED | QUESTIONS | PRIOR MEASURES |
|---|---|---|
| WHAT FAULT<br>☒ V.B. LINE<br>☐ BG STN | REPEATABILITY?<br>→ PERIODIC<br>SHAPE?<br>→ BAND-LIKE | ☐ PS BDY NOT<br>☒ FIX RLR CHG<br>☐ CON GLS NOT<br>☐ DVL RLR NOT |
| | | T/S MEASURES<br>☐ PS BDY CHG<br>☐ PS BDY CLN |
| CAUSE CANDIDATES<br>☒ PS BDY STN 6<br>☐ PS BDY FLW 3 | ☐ FL CVR STN 3<br>☐ CLN BLD BRK 1 | |

FAULT DIAGNOSIS EXPERT SYSTEM

BACKGROUND OF THE INVENTION

The present invention generally relates to artificial intelligence systems, and more particularly to a fault diagnosis expert system that infers a cause of a machine fault on the basis of expert knowledge which is stored in a knowledge base.

Generally, a knowledge base used in a fault diagnosis expert system based on an expert model takes a structure of a so-called search tree in which causes and effects are linked together in a hierarchical fashion. In constructing this search tree structure of the knowledge base, an enumeration technique is usually selected. This enumeration technique is to enumerate all direct causes which may possibly produce a resulting event so that these direct causes respectively branch from the resulting event as a starting point of searching to form primary nodes of this search tree. And further enumerated from these primary nodes are subsequent causes which may directly produce each of the above described causes as an event resulting from those subsequent causes, and these direct causes respectively branch from each of the resulting events which then becomes a new starting point of searching so that secondary nodes of the search tree are formed.

However, there is a case in which a proper branching decision must be made depending on the previously traced events or nodes of the above described search tree. This branching decision is necessary for selecting which path of the search tree at branch points when reasoning or tracing back through the search tree during inference. In this respect, a conventional fault diagnosis expert system cannot supply an appropriate suggestion for branching, and may sometimes produce discrepancies between the observed causes and the inferred causes. For, the conventional fault diagnosis expert system is usually not designed to take considerations on the pretraced nodes of the search tree to make a proper searching for a true cause of machine trouble.

In addition, there are two kinds of the causes that constitute the nodes of the above described search tree. One of the two kinds of the causes is a cause for which a specific remedy for removing sources of trouble or eliminating occurrence of faults may be given to the user. This type of causes are called hereinafter a self-dependency cause. The other type is a cause which has no specific remedy, and a specific troubleshooting measure for removing sources of trouble is provided with another downstream cause in the search tree. This type of causes is called hereinafter an other-dependency cause. Generally, in a case of the self-dependency causes, it is possible to eliminate sources of trouble by taking a troubleshooting measure described together with that self-dependency cause. But, in a case of the other-dependency causes, it is not possible to remove sources of trouble as far as attention is paid to those other-dependency causes.

The fault diagnosis expert system generally carries out fault diagnosis in which one or more cause candidates for a true cause of machine trouble are detected by tracing back through the search tree. Taking troubleshooting measures that are given to the user with respect to each of these cause candidates allows the elimination of sources of machine trouble. However, the causes being predicted in a conventional fault diagnosis expert system have no difference between self-dependency and other-dependency. When the user detects an other-dependency cause among the cause candidates given as the diagnosis results, the user must further search for one or more self-dependency causes that may produce that other-dependency cause, and these self-dependency causes exist at deeper nodes of the search tree than such other-dependency cause. Such a task for additional searchings with the fault diagnosis knowledge base costs the user unnecessary time and work.

SUMMARY OF THE INVENTION

Accordingly, it is a general object of the present invention to provide a fault diagnosis expert system in which the above described problems are eliminated.

Another and more specific object of the present invention is to provide a fault diagnosis expert system for locating and eliminating sources of a machine trouble, which comprises a storage part for storing a fault diagnosis expert knowledge constructed in a hierarchical structure of a search tree in which cause-to-effect links connecting high-level effect events to low-level cause events are pre-defined and all possible low-level cause events are pre-enumerated for each high-level effect event, the low-level cause events being candidates for a cause producing the high-level effect events, a user interface part for providing a user with questions and responses regarding state of the machine trouble, allowing the user to supply user information in reply to the questions from the user interface part and allowing the user interface part to provide the user with the responses in reply to the user information, an inference part for inferring a cause of the machine trouble with the fault diagnosis expert knowledge stored in the storage part and the user information supplied from the user, and an outputting part for allowing inference results supplied from the inference part to be displayed for the user, wherein the fault diagnosis expert knowledge stored in the storage part includes cause candidate criteria which are pre-defined as events used for the inference part to trace back appropriate nodes within the search tree when the inference part infers the cause of the machine trouble to locate a true cause thereof. According to the present invention, it is possible to make a branching decision when searching for a true cause of trouble by tracing back through the search tree on the basis of which nodes of the search tree are previously traced, allowing discrepancies between the inferred causes and the observed effects to be eliminated.

Still another object of the present invention is to provide a fault diagnosis expert system for locating and eliminating sources of a machine trouble, which comprises a storage part for storing a fault diagnosis expert knowledge constructed in a hierarchical structure of a search tree in which cause-to-effect links connecting high-level effect events to low-level cause events are pre-defined and all possible low-level cause events are pre-enumerated for each high-level effect event, the low-level cause events being candidates for a cause producing the high-level effect events, a user interface part for providing a user with questions and responses regarding state of the machine trouble, allowing the user to supply user information in reply to the questions from the user interface part and allowing the user interface part to provide the user with the responses in reply to the user information, an inference part for inferring a cause of the machine trouble with the fault diagnosis expert knowledge stored in the storage part and the user information supplied from the user, and an outputting part for allowing inference results supplied from the inference part to be displayed for the user, wherein the cause-to-effect links pre-defined within the fault diagnosis expert knowledge stored in the storage part have an identifier for indicating a difference between self-dependency causes and other-dependency causes, the self-dependency causes having specific troubleshooting measures for eliminating sources of the machine trouble or preventing occurrence of the machine trouble, the other-dependency causes having no specific troubleshooting measures and being followed by low-level self-dependency causes downstream of the other-dependency cause through the search tree, the low-level self-dependency causes having the specific troubleshooting measures. According to the present invention, even when the inferred cause is an other-dependency cause, it is possible to enumerate appropriate cause candidates that are the corresponding self-dependency causes which may exist at downstream nodes of the search tree being traced back from a node of that other-dependency cause. Therefore, it is possible to present to the user proper and definite troubleshooting measures for eliminating sources of machine trouble at once.

Other objects and further features of the present invention will be apparent from the following detailed description when read in conjunction with the accompanying drawings.

BRIEF DESCRIPTION OF THE DRAWINGS

FIGS. 7A and 7B are diagrams for explaining the difference between self-dependency causes and other-dependency causes according to the present invention;

FIG. 8 is a diagram for explaining the concept of troubleshooting measures according to the present invention;

FIGS. 10 through 23 are diagrams showing specific frames which may be applied to the present invention;

FIG. 25 is a view showing an example of a diagnosis screen which may be applied to the present invention.

DESCRIPTION OF THE PREFERRED EMBODIMENT

Figure 1:
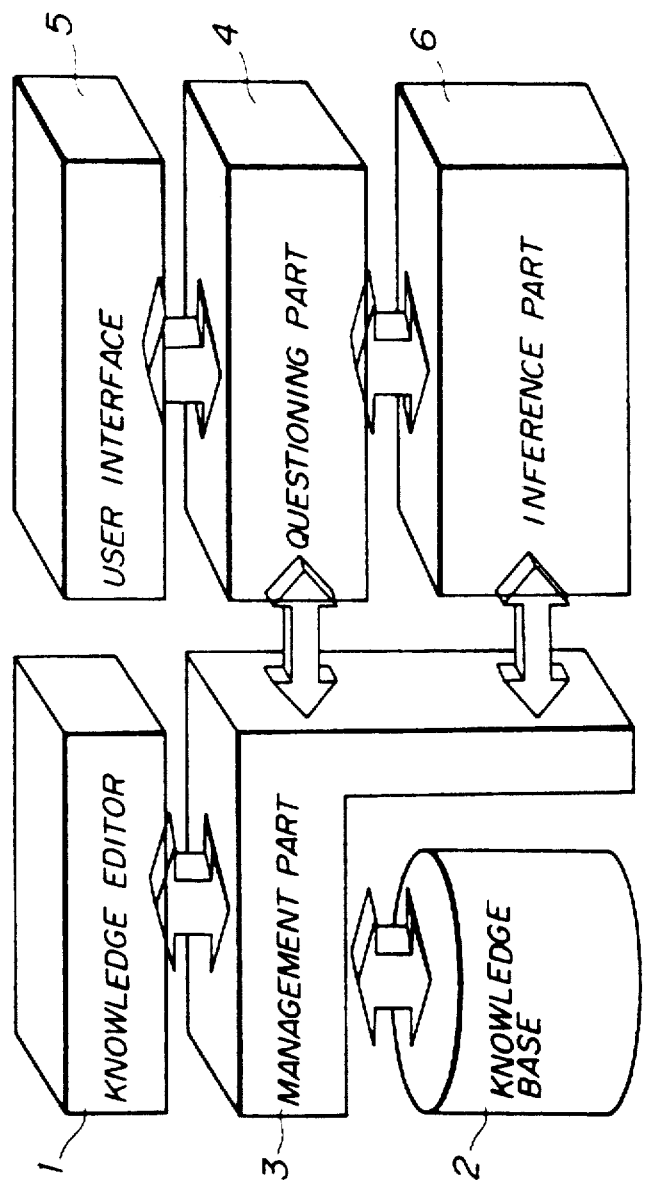
FIG. 1 is a diagram showing the construction of an embodiment of a fault diagnosis expert system according to the present invention.

First, a description will be given of a construction of a fault diagnosis expert system according to the present invention with reference to FIG. 1. As shown in FIG. 1, the fault diagnosis expert system comprises a knowledge editor 1 for editing an expert knowledge during knowledge base making and updating, a knowledge base 2 for storing the expert knowledge, a management part 3 for performing management of the knowledge base 2, a questioning part 4 for supplying a set of prescribed questions to a user and supplying user information from the user to the fault diagnosis expert system in reply to the prescribed questions, a user interface 5 for displaying the questions from the questioning part 4 on a diagnosis screen within the user interface 5 and for supplying the user information as well as the diagnosis results on the diagnosis screen after receiving the user information from the user in reply to the prescribed questions, and an inference part 6 for inferring a cause of a machine fault by using the user information supplied from the user and the expert knowledge stored in the knowledge base 2. When inputting the expert knowledge to the knowledge base 2, the user makes use of the knowledge editor 1 to edit the expert knowledge data, and the management part 3 serves to store the inputted expert knowledge data on the knowledge base 2. And, when carrying out inference, the questioning part 4 provides the user with the prescribed questions such as fault identification, environmental conditions and service conditions of a machine on problem through the user interface 5. After receiving the user information from the user in reply to the questions, the inference part 6 locates the cause of the machine fault, through constraining or exclusion of possible candidates for the cause, on the basis of the expert knowledge stored in the knowledge base 2 as well as the user information inputted by the user. Then, the inference results thus obtained are finally outputted to the user interface 5 so that the inference results appear on the diagnosis screen which is available to the user. In the fault diagnosis expert system according to the present invention, cause candidate criteria are added to the expert knowledge to be stored in the knowledge base 2, and the expert knowledge is stored by distinctly classifying the causes into self-dependency causes and other-dependency causes. Using the cause candidate criteria and the self-dependency causes as well as the other-dependency causes, the present fault diagnosis expert system carries out a fault diagnosis.

Next, a description will be given of the contents of the expert knowledge being stored in the knowledge base 2 which is built within the fault diagnosis expert system according to the present invention. In the following description, an example of a frame-based knowledge base is chosen as a structure representation of the expert model which facilitates installation of the fault diagnosis expert knowledge on a computer system in practical use.

(1) Structure of Knowledge Base

Figure 9:
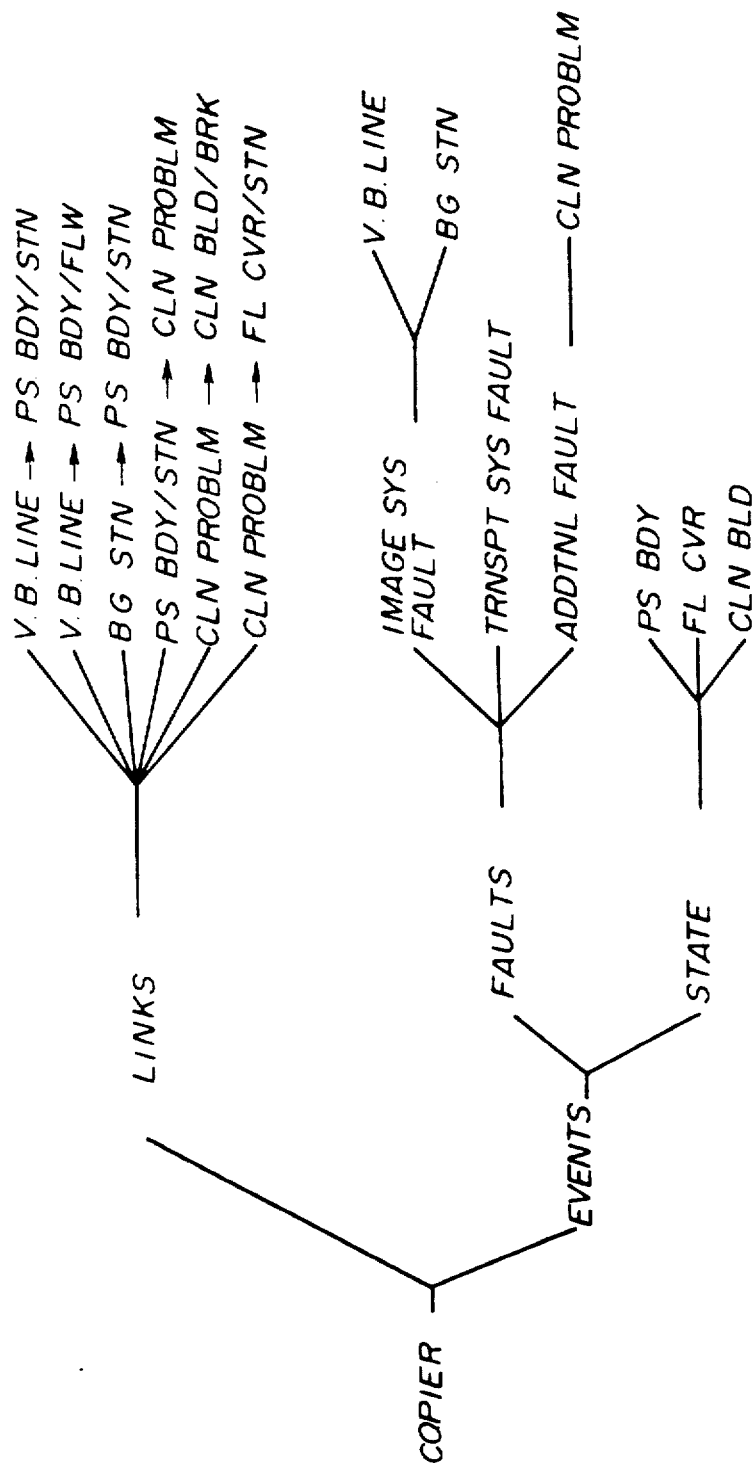
FIG. 9 is a diagram showing an example of a hierarchical frame-based structure which may be applied to the present invention.

Generally, an event may be represented by a set of expressions including an object, an attribute name and an attribute value. In the case of the frame-based fault diagnosis knowledge base, an event is represented primarily by a set of expressions including an object of diagnosis, a slot name and a slot value. Frames of this frame-based fault diagnosis knowledge base are designed to have a hierachical frame-based structure of the expert model which may be represented by a structure of a search tree linking effects to causes in a hierarchical manner, as shown in FIG. 9. This search tree structure starts with the above described object of fault diagnosis, for example, a copying machine, and this object of fault diagnosis is followed by two major categories which are cause-and-effect links and observed events. Among the cause-and-effect links stored in the knowledge base, there are several members including supporting conditions, certainty factors, cause candidate criteria and other detailed information. The observed events are classified into specific members which include specific faults, machine component state, environmental conditions, service conditions and others relating to the object of fault diagnosis, the copying machine. Each of the specific faults stored in the knowledge base has a slot that describes attributes of that specific fault including a repeatability, a shape and a location of that specific fault. With the machine component state stored in the knowledge base, a machine component name, a state of that fault and a suggested troubleshooting measure to be taken are described.

(2) Overview of Expert Model

In this fault diagnosis expert system, in order to make efficient use of the expert knowledge and the user information for retrieval and checking made during inference, the faults of the machine concerned, the misbehaviors or undesired state of the machine components, the environmental conditions surrounding the machine, and the service conditions when the machine is actually used are all classified into the category of events. The search tree which describes relationships between effects and causes with respect to the faults starts with some faults observed at a top level of the search tree, and each of these top-level fault events is followed by cause candidates (primary causes of the faults observed) which may produce the faults observed, and further each of these cause candidates is followed by subsequent cause candidates (secondary causes of the faults observed) which may produce the primary cause events. And this is repeated until bottom-level causes in the search tree are reached. This search tree is built in accordance with the expert model that has a structure in which the effects and causes are linked together in the above described manner, and this search tree may be represented as a diagram showing cause-and-effect relationships which has a fixed direction from effect to cause. Each cause candidate generally has the measure of likelihood of that cause candidate to be a true cause of the machine trouble, and this measure of likelihood of the cause candidate is called hereinafter a certainty factor. The value of this certainty factor is predetermined depending on the likelihood of the cause candidate to produce the effect concerned (or, depending on the frequency of occurrence of the cause candidate). The supporting conditions described above are a factor influencing the value of the certainty factor, and the value of the certainty factor varies (increases or decreases) depending on the selections made by the user with respect to these supporting conditions. The troubleshooting measure is a suggested action required for preventing the occurrence of the observed faults or eliminating the sources of the machine trouble, and this troubleshooting measure is provided with an effectiveness factor that shows the effectiveness of taking the suggested action for elimination of the sources of trouble or for prevention of occurrence trouble.

(3) Representation of Events

Representation of the events is used to express various phenomena which include the faults of the machine as the object of diagnosis, the behaviors or state of the components of the machine, the environmental conditions surrounding the machine, the service conditions of the machine and other related matters to fault diagnosis. As described above, the respective events are represented by a set of three expressions of [object, attribute name, attribute value], and when a certain event can be expressed only with a phenomenon name that event is represented by [phenomenon name, -, -]. In this case, the event is written only with the phenomenon name being followed by two hyphens "-" that indicate the attribute name and the attribute value.

Example 1: [vertical black line, -, -]
Example 2: [temperature, state, high]
Example 3: [copying mode, state, repeat]
Example 4: [cleaning blade, state, stain]

Especially when an event is either a fault observation or a cause of the misbehavior the event is hereinafter referred to as a fault.

(4) Search Tree

Figure 2:
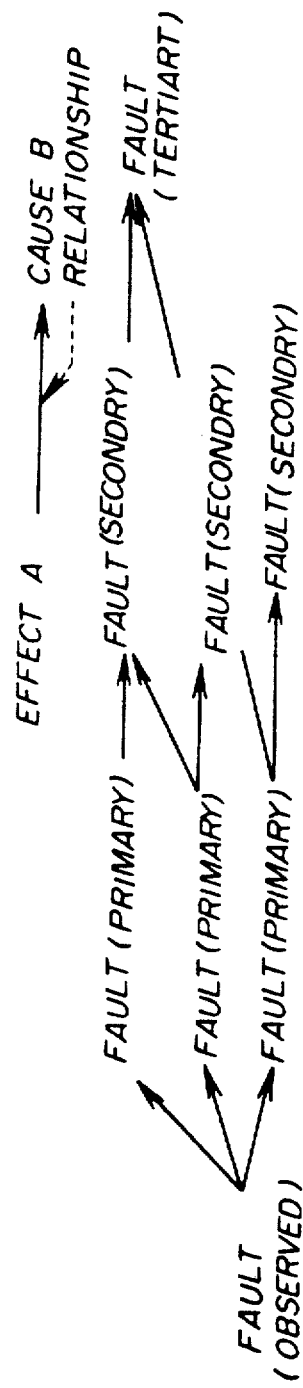
FIG. 2 is a diagram for explaining a link of faults used in the fault diagnosis expert system.

As described above, cause-and-effect relationships with respect to machine faults are expressed as a diagram indicating a fixed direction as shown in FIG. 2, and this diagram is called herein the search tree. This search tree starts with some faults observed, each of which is followed by some cause candidates (primary causes) which may directly produce the fault observed. Each of these cause candidates is further followed by subsequent cause candidates (secondary causes). This is repeated until a bottom-level cause in the search tree is reached. In the example of the search tree which describes the cause-and-effect relationships of the events, two major features can be seen. One of the features is that as many cause candidates as possible are enumerated by taking attention to one specific fault. The other is that there is a direct cause-and-effect relationship between a specific cause event and a specific effect event.

(5) Certainty Factor

Figure 3:
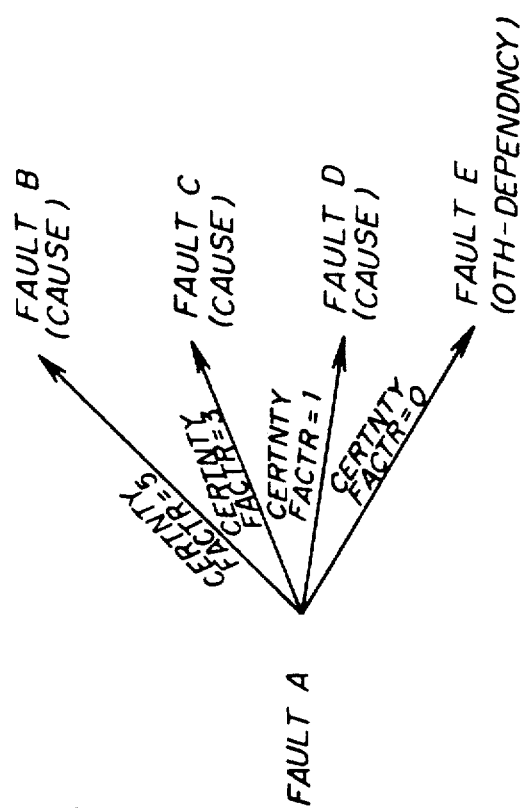
FIG. 3 is a diagram for explaining the setting of certainty factors used in the fault diagnosis expert system.

In a diagram shown in FIG. 3, a certainty factor is given to each of four arrows connecting an effect fault event (Fault A) to four cause fault events (Faults B, C, D and E). This certainty factor is expressed by an integer number between 0 and 5, and the value of the certainty factor in this diagram indicates the degree of likelihood of a cause fault event (Faults B through E) to be a true cause of an effect fault event (Fault A). A cause fault having the maximum likelihood of producing the effect cause is pre-defined with the greatest certainty factor which is equal to 5, while a cause fault having the minimum likelihood of producing the effect fault is pre-defined with the second smallest certainty factor which is equal to 1. In the fault diagnosis expert system according to the present invention, the smallest certainty factor which is equal to 0 is used to uniquely indicate an other-dependency cause that will be described below. In other words, this certainty factor equal to 0 is an identifier for differentiating other-dependency causes from self-dependency causes that will also described below.

(6) Supporting Conditions

Figure 4:
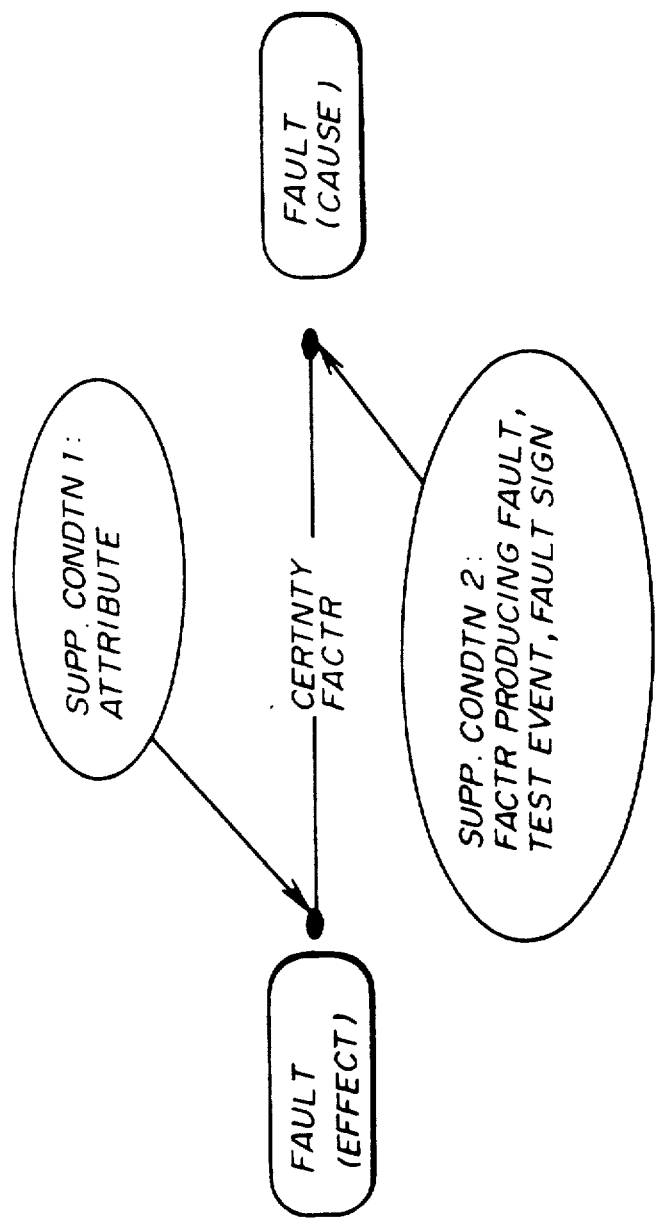
FIG. 4 is a diagram for explaining the concept of supporting conditions according to the present invention.

If it is possible that two or more events having a cause-and-effect relationship take place at the same time, supporting conditions may be used to facilitate the inference process of locating a true cause of a machine trouble by increasing the certainty factor of a particular cause which relates closely to the supporting conditions. These supporting conditions are a factor which directly influences the certainty factor of such a cause. When an event is in a state that meets a supporting condition, a positive weight (a positive number) is added to a certainty factor of that event, allowing the resulting certainty factor to be increased. When the event is not in a state that meets the supporting condition, a negative weight (a negative number) is added to the certainty factor, allowing the resulting certainty factor to be decreased. This helps carry out the optimal searching for a true cause of a machine trouble to suit the circumstances around the machine. As shown in FIG. 4, it is possible to set up two or more supporting conditions in a certain cause-and-effect relationship between a cause fault and an effect fault. A representation of a supporting condition comprises a conditional statement used for discriminating occurrence of an event for concern, a positive weight (positive integer number between 0 and 5) to be added to a certainty factor of the event when the conditional statement is affirmative, and a negative weight (negative integer number between 0 and -5) to be added to the certainty factor of the event when the conditional statement is negative. The conditional statement may include descriptions of a plurality of events, and, in such a case, only when all the events expressed in the conditional statement take place the positive weight is added to the certainty factor resulting in an increase of the value of the certainty factor, while the negative weight is added to the certainty factor resulting in a decrease of the value of the certainty factor when at least one of those events in the conditional statement does not take place. Confirmation as to whether any event included in the conditional statement of the supporting condition takes place is made during inference with user information being inputted by the user to the user interface 5 of the fault diagnosis expert system. Therefore, all the events described as the conditional statement must be one that can be clearly observed by the user or one that may be easily checked by the user. Hence, the events that may be used as the conditional statement of a supporting condition are defined as follows:

events describing details of an effect event test events for verification of occurrence of a cause event events describing signs of trouble resulting from a cause fault that can be observed by the user events describing states in which a cause fault is very likely to take place.

(7) Cause Candidate Criteria

Figure 5:
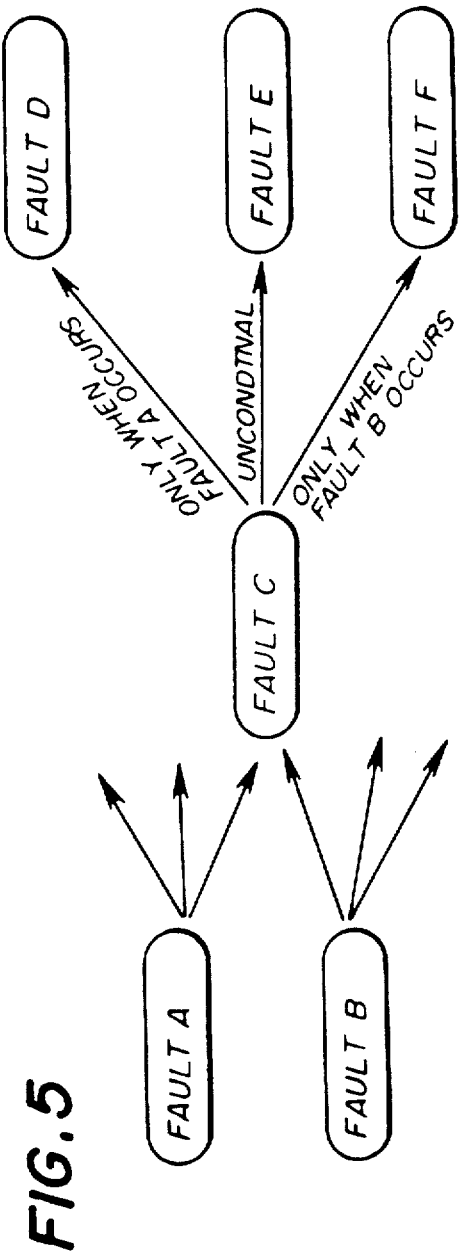
FIG. 5 is a diagram showing an example of reasoning or tracing back through the search tree using the supporting conditions.

Generally, a search tree structure is built through enumeration of all possible cause candidates for each of faults which a machine exhibits. Except for direct cause-and effect relationships, discrepancies between cause and effect may sometimes be produced in the course of inference when considering the search tree structure. In FIG. 5, two effect events (Fault A and Fault B) are observed with the machine concerned, and all possible primary cause candidates are enumerated for each of these effect events, and among the primary cause candidates there is a primary cause candidate (Fault C). For this primary cause candidate (Fault C), three secondary cause candidates (Faults D, E and F) are further enumerated, as shown in FIG. 5. In this search tree structure, the secondary cause candidate (Fault D) becomes a cause candidate of the Fault C only when the Fault C has produced the effect Fault A, and similarly the Fault F becomes a cause candidate of the Fault C only when the Fault C has produced the effect Fault B. But, the Fault E is unconditionally a cause candidate of the Fault C. Generally, a reasoning must be done under this kind of constraint. In the present case, the above described constraint is necessary because the Fault C involves some ambiguity relating to the occurrence of effect faults. To carry out an exact reasoning or inference with the above described search tree structure, it is necessary to divide the Fault C into two different events, for example, Fault C' and Fault C". However, it is not always possible to find a suitable method of dividing a fault event into several different events.

Figure 6:
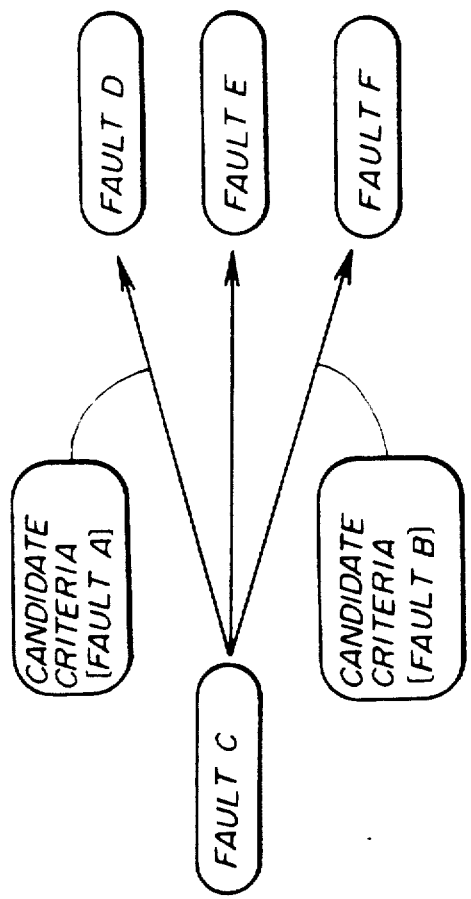
FIG. 6 is a diagram for explaining the setting of cause candidate criteria used in the fault diagnosis expert system.

Accordingly, the present invention proposes the use of cause candidate criteria for inference of a true cause of trouble without producing a discrepancy between cause and effect in a case in which a branching decision must be made depending on the pretraced events or nodes of the search tree. Making this branching decision is necessary when selecting which path of the search tree at branch points during a reasoning or tracing back through the search tree. The cause candidate criteria described above are pre-defined with respect to cause-and-effect relationships appearing in the search tree, as shown in FIG. 6. The cause candidate criteria are a discrimination condition to see whether or not a certain effect event not directly relating to the cause-and-effect relationship takes place with a cause event, and this effect event used in the cause candidate criteria for discrimination may be made up of a plurality of events. With the cause candidate criteria, the fault diagnosis expert system can select a cause event as an actual cause candidate of an effect event if a cause candidate criterion regarding the cause event and the effect event is affirmative, while if the cause candidate criterion is negative the expert system excludes the cause event from candidates for a true cause of that effect event. When there is no cause candidate criterion, the cause event is always a candidate for a true cause of the effect event. In FIG. 6, for example, Fault D is taken as a cause candidate of Fault C when Fault A takes place in a pretraced searching path, and it is excluded from the object of searching when Fault A does not take place. The cause candidate criterion in this case is whether or not Fault A does take place in the pretraced searching path. On the other hand, Fault E is always taken as a cause candidate of Fault C because the relationship between Fault C and Fault E has no cause candidate criterion.

(8) Self-Dependency Causes, Other-Dependency Causes

There are two kinds of causes which produce a machine trouble, self-dependency causes and other-dependency causes. The self-dependency causes are a cause that is accompanied with description of a specific troubleshooting measure for eliminating sources of trouble or for preventing occurrence of trouble. The other-dependency causes are an upstream cause within a search tree, which is followed by another downstream cause being provided with a description of a specific troubleshooting measure for eliminating sources of trouble or for preventing occurrence of trouble. Concerning self-dependency causes, it is possible to eliminate sources of trouble if the indicated troubleshooting measure is taken, but, as for other-dependency causes, it is not possible to prevent occurrence of trouble or eliminate sources of trouble because they have no specific troubleshooting measure. Causes in a case of a conventional fault diagnosis expert system are identified with no distinction between such self-dependency and other-dependency. However, the present invention proposes the use of these self-dependency causes and other-dependency causes which are distinctly identified and stored in the knowledge base of the fault diagnosis expert system, allowing presentation of a specific troubleshooting measure on the user interface.

FIGS. 7A and 7B show examples of the above described self-dependency causes and other-dependency causes for explaining a difference therebetween. Shown in FIG. 7A is a case where a trouble of a copying machine takes place due to a motor problem. It cannot be said that this motor is driven to rotate independently of other components of the copying machine. This rotating operation of the motor is controlled by an electric signal sent from another component, for example, a driving plate to the motor. Two causes that are supposed to be sources of the motor problem may be enumerated, one cause being a defective motor and the other a defective driving plate. In the search tree as partially indicated in FIG. 7A, a direct cause producing the trouble of the copying machine observed by the user is the motor problem, but this cause which is the motor problem is an other-dependency cause having no specific troubleshooting measure to eliminate the sources of such a machine trouble. In this case, the defective motor and the defective driving plate are supposed to be a self-dependency cause which is accompanied with a specific troubleshooting measure. Therefore, for eliminating the sources of the machine trouble, it is necessary to change either the motor or the driving plate, whichever may be found defective. Shown in FIG. 7B is another case where a cleaning problem produces a trouble of a copying machine being observed. Two causes may be enumerated as ones producing such a cleaning problem, a cleaning blade break and a fluorescent lamp stain. This cleaning problem is an other-dependency cause in the search tree, which has no immediate troubleshooting measure. The cleaning blade break and the fluorescent lamp stain which are located at downstream positions in the search tree are a self-dependency cause accompanied with a specific troubleshooting measure.

One conceivable method to distinguish the self-dependency causes from the other-dependency causes is to use an identifier which indicates a difference between these two kinds of causes. A more simple method is to make use of the above described certainty factor, a certainty factor equal to zero being taken as an identifier of other-dependency causes and a certainty factor not equal to zero (or, an integer number between 1 and 5) as an identifier of self-dependency causes. And the fault diagnosis expert system is constructed so as to discriminate the other-dependency causes when a frame having a certainty factor equal to zero is found.

(9) Troubleshooting Measures

FIG. 8 is a diagram for explaining a concept of troubleshooting measures which are used in the fault diagnosis expert system according to the present invention. One or more specific troubleshooting measures are attached to all self-dependency causes. A troubleshooting measure is expressed with descriptions given of 1) a name of object of troubleshooting measures to be taken, 2) a content of troubleshooting measures, 3) an effectiveness factor indicating how effective the troubleshooting measures to eliminate sources of the trouble are, and 4) a procedure for taking troubleshooting measures which help the user to carry out them. Once a troubleshooting measure for a cause candidate is performed, the likelihood of that cause candidate to be a true cause of trouble is reduced to a some degree. The effectiveness factor provided within a troubleshooting measure is expressed by an integer number between 0 and 5, and when that troubleshooting measure is taken by the user the value of the effectiveness factor is subtracted from the certainty factor of a cause regarding the troubleshooting measure, thereby the resulting certainty factor being decreased. And, when a troubleshooting measure with an effectiveness factor equal to 5 is taken, it is supposed that the sources of trouble are completely eliminated. A few examples of troubleshooting measures are given below:

EXAMPLE 1

| Object | cleaning brush |
| --- | --- |
| Content | change |
| Effectiveness Factor | 5 |

EXAMPLE 2

| Object | cleaning brush |
| --- | --- |
| Content | cleaning |
| Effectiveness Factor | 2 |

If these examples are compared with each other, it is obvious that the measure of changing the cleaning brush is more effective than the measure of cleaning the cleaning brush, and that taking the measure of changing the cleaning brush allows a cause producing a cleaning brush problem to be eliminated completely from among cause candidates for a true cause of trouble for concern.

Next, a description will be given of the operation of an embodiment of the fault diagnosis expert system according to the present invention which is shown in FIG. 1. For each of the frames making up the knowledge base 2, the user at first has to input and edit necessary information to produce an expert knowledge of the fault diagnosis expert system through the knowledge editor 1. The contents of the respective frames inputted are as shown in FIGS. 10 through 23, for example. As indicated in FIGS. 10 through 23, the contents of a frame are expressed with the user information collected from among several items or slots including a frame name, a link, a repeatability, a state, a location, a certainty factor, an effect, a cause, supporting conditions, cause candidate criteria and others.

Figure 24:
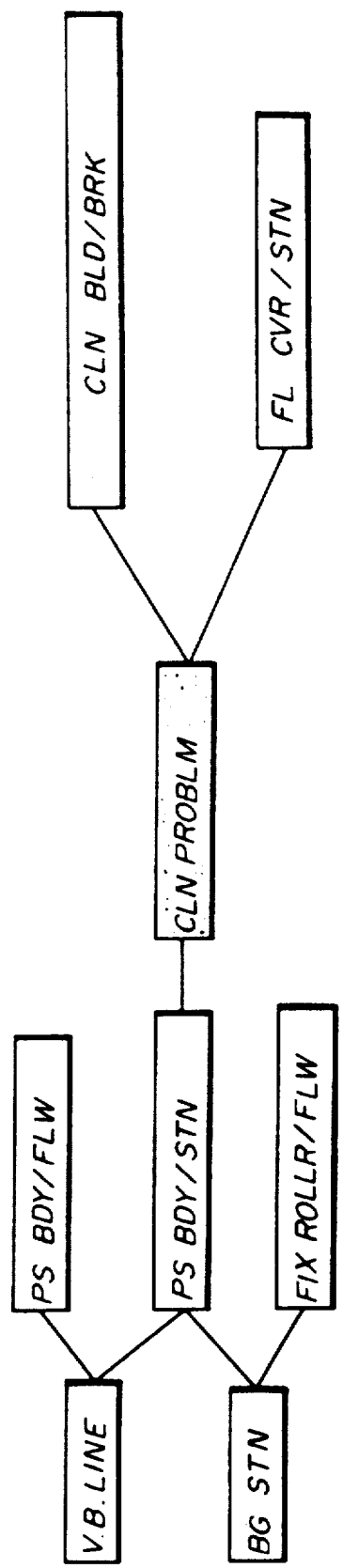
FIG. 24 is a diagram showing an example of a search tree structure made up of the above described specific frames.

A search tree as shown in FIG. 24 is built by inputting information of each of these frames. In this search tree indicated in FIG. 24, which is constructed with Frames 1 through 14 respectively shown in FIGS. 10 through 23, the frame 1 with frame name as vertical black line ("V.B.LINE" in FIG. 10) and the frame 2 with frame name as copy background stain ("BG STN" in FIG. 11) are a starting point of tracing back along the search tree to identify and locate a true cause of trouble. In searching, frames that are described in link slots of the frames 1 and 2 are taken out from the knowledge base and these frames taken out are a next starting point for subsequent searching. This process is repeated until a bottom-level cause is found. The cleaning problem ("CLN PROBLM") indicated with a shaded block in FIG. 24 is an other-dependency cause having no troubleshooting measure to eliminate sources of trouble. To indicate that this event of the cleaning problem in the search tree shown in FIG. 24 is an other-dependency cause, the value of a certainty factor of the frame concerned is set to zero, as indicated in Frame 12 of FIG. 21. As described above, the certainty factor equal to zero within this frame indicates that the event concerned is an other-dependency cause. Accordingly, it is possible for an operator who inputs data of the knowledge base to arrange neatly a large volume of accumulated information on the expert knowledge because the differences between the self-dependency causes and the other-dependency causes are easily viewed when the operator inputs the information concerned.

Consider that there are two causes that produce the above described event of the cleaning problem ("CLN PROBLM"), a cleaning blade break ("CLN BLD BRK") and a fluorescent lamp cover stain ("FL CVR STN"). In this respect, the cleaning blade break is a cause of the cleaning problem only when unwanted vertical black lines ("V.B.LINE") appear on a reproduced copy, while the fluorescent lamp cover stain ("FL CVR STN") is a cause of the cleaning problem only when either the vertical black line ("V.B.LINE") or the background stain ("BG STN") takes place as a fault. In this manner, a branching destination node differs depending on the pretraced searching path in the search tree. To carry out inference without causing a discrepancy between cause and effect, the above described cause candidate criteria are added to the corresponding frames in the fault diagnosis expert system according to the present invention. For example, a cause candidate criterion having a value corresponding to vertical black line ("V.B.LINE") is added to the frame 13 shown in FIG. 22, and two cause candidate criteria with values corresponding to vertical black line ("V.B.LINE") and background stain ("BG STN") are added to the frame 14 shown in FIG. 23.

Figure 26:
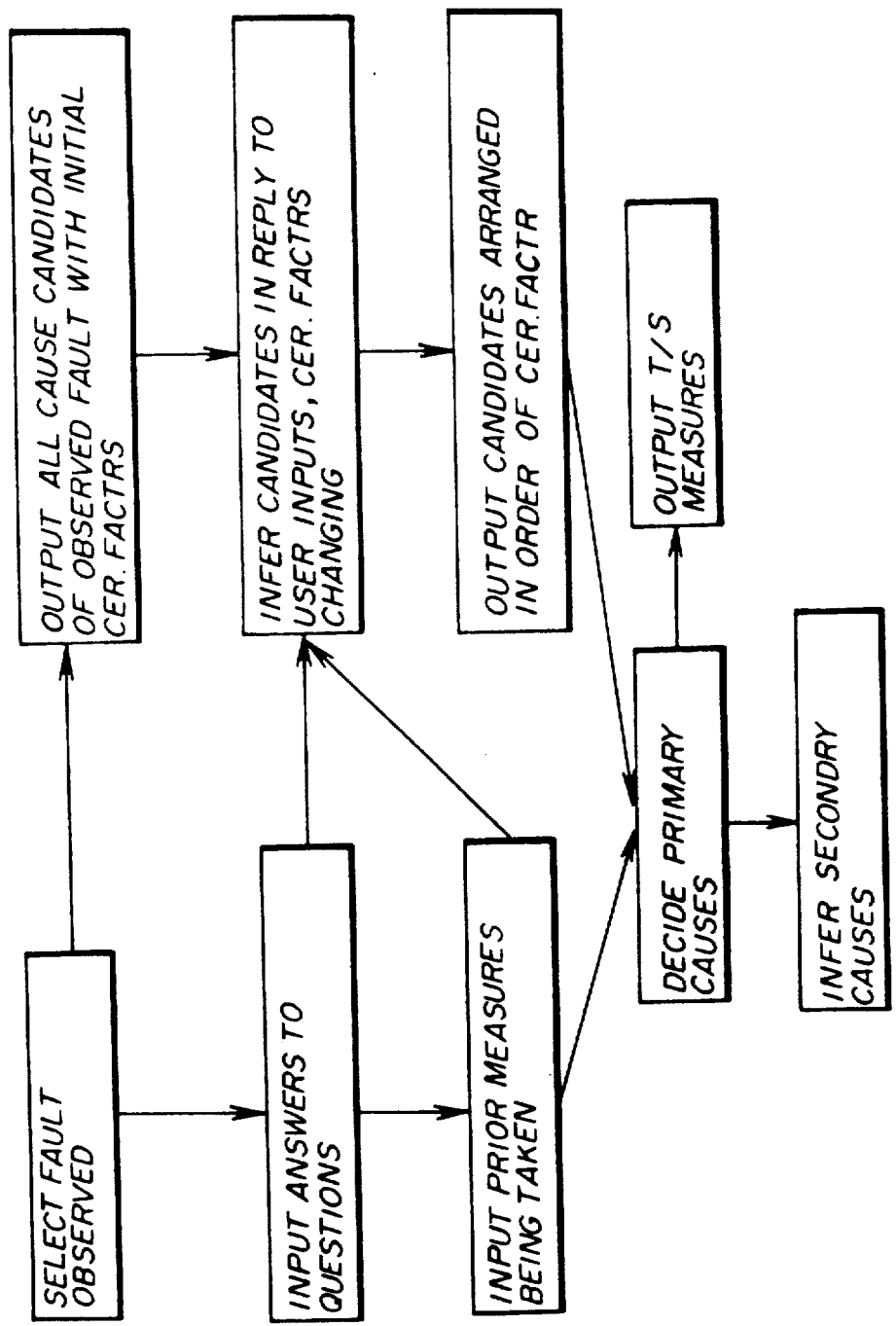
FIG. 26 is a flow chart for explaining the procedure of a fault diagnosis according to the present invention.

Next, a description will be given of a fault diagnosis made by the fault diagnosis expert system according to the present invention which is carried out with the frame-based knowledge base as described above. FIG. 26 is a flow chart for explaining briefly the diagnosis carried out by the fault diagnosis expert system. It is now assumed that the copying machine as the object of fault diagnosis exhibits the following state of machine trouble:

| Fault Observed | vertical black line |
|---|---|
| State of V.B Line | |
| Repeatability | periodical |
| Shape | band-like |
| Prior Measures | change of fixing roller |

In a first step, the inference part 6 requests the questioning part 4 that the questioning part 4 asks the user what kind of trouble takes place with the copying machine. The questioning part 4 then requests the management part 3 to supply a list of faults, and the management part 3 collects all the related fault information which is stored in the knowledge base 2. Next, the questioning part sends the list of the faults to the user interface 5, allowing all the faults to appear at a window of the diagnosis screen of the user interface 5. In this case, for example, two faults including a vertical black line and a background stain are displayed on the diagnosis screen as shown in FIG. 25, and the fault diagnosis expert system waits for the user to select any of these faults displayed. In this concern, FIG. 25 shows an example of the diagnosis screen of the user interface 5, and this diagnosis screen consists of five windows including a FAULTS OBSERVED window, a QUESTIONS window, a CAUSE CANDIDATES window, a PRIOR MEASURES window and a TROUBLESHOOTING MEASURES window. As described above, the fault observed in this case is the vertical black line, and the user selects the upper item in the FAULTS OBSERVED window of the diagnosis screen and a square indication of the selected item is inverted from OFF to ON, as indicated in FIG. 25.

The fault information selected by the user is sent to the inference part 6, and the inference part 6 takes access to the knowledge base 2 so that all possible cause candidates searchable from the selected fault that is, in this case, the vertical black line are inferred and outputted to the CAUSE CANDIDATES window of the diagnosis screen. Each of the cause candidates has a certainty factor, and each certainty factor of the inferred cause candidates is also displayed at this CAUSE CANDIDATES window of the diagnosis screen, as indicated in FIG. 25. More specifically, the inference part 6 takes access to the Frame 1 (FIG. 10), stored in the knowledge base 2, corresponding to the selected fault, and looks into the value of the Link slot in the Frame 1 to find two values which are [vertical black line → photosensitive body/stain] ("V.B.LINE → PS BDY/STN") and [vertical black line → photosensitive body/flaw] ("V.B.LINE → PS BDY/FLW"). Then, the inference part 6 reads out the corresponding two frames from the knowledge base 2. In this case, these two frames are the Frame 7 (FIG. 16) and the Frame 8 (FIG. 17), which have the same frame name as those found from the Link of the Frame 1, respectively. Next, the inference part 6 reads out the values of the Cause slots of the Frames 7 and B from the knowledge base 2 and finds that they are "photosensitive body, state, stain" and "photosensitive body, state, flaw". In addition, the inference part 6 reads out the values of the certainty factors of the Frames 7 and 8, and finds that they are equal to 3 and 2 respectively. Then, the cause candidates thus found are displayed at the CAUSE CANDIDATES window and they are arranged in order of the detected value of the certainty factor. In this case, [photosensitive body stain 3] ("PS BDY STN 3") and [photosensitive body flaw 2] ("PS BDY FLW 2") initially appear in this order on the diagnosis screen.

At the same time, the values of the SUPPORTING CONDITIONS slots of the Frames 7 and 8 are read out to indicate questions corresponding to these values at the QUESTIONS window of the diagnosis screen as shown in FIG. 25. In this case, two questions which are "repeatability ?" and "shape?" are displayed at the QUESTIONS window. If the user, in reply to these questions, inputs answers such as "periodical" and "band-like", respectively, then the fault diagnosis expert system gives an affirmative answer to the supporting conditions 1 and 2 of the Frame 7 (FIG. 16) and the supporting condition of the Frame 8. As a result, both the positive weights of the supporting conditions 1 and 2 of the Frame 7 (equal to 1 and 2, respectively) are added to the value of the certainty factor (initially equal to 3) of the Frame 7 allowing the value thereof to increase from 3 to 6, while the positive weight of the supporting condition of the Frame 8 (equal to 1) is added to the value of the certainty factor of the Frame 8 (initially equal to 2) resulting in an increase of the value of the certainty factor from 2 to 3. Then, the two cause candidates with the thus modified values of the certainty factors are displayed on the diagnosis screen, and they are arranged in order of such new certainty factors. In this case, for example, [photosensitive body stain 6] ("PS BDY STN 6") and [photosensitive body flaw 3] ("PS BDY FLW 3") appear in this order at the CAUSE CANDIDATES window of the diagnosis screen, as indicated in FIG. 25.

In addition, when there is a prior measure which is previously taken for eliminating sources of faults being observed, the user selects such a prior measure in the PRIOR MEASURES window of the diagnosis screen so that an indication of the prior measure is turned from OFF to ON. In the present case, a fixing roller change as the prior measure is selected and this is indicated in the PRIOR MEASURES window of the diagnosis screen shown in FIG. 25. As described above, on the basis of the user information to the questions as well as the prior measure selected by the user, the fault diagnosis expert system modifies the value of the certainty factor (being increased or decreased) to facilitate restriction of the range of cause candidates that may produce a fault observed, and, each time an answer is received from the user, the fault diagnosis expert system calculates the certainty factors resulting in modified values of the certainty factors and displays the cause candidates at the CAUSE CANDIDATES window of the diagnosis screen which are placed there in order of the certainty factor having the modified values.

It is now assumed that the source of the machine trouble [vertical black line] is found to be [photosensitive body/stain] after all the cause candidates on the diagnosis screen are checked. If the user therefore selects the cause candidate [photosensitive body/stain 6] ("PS BDY/STN 6") which is displayed at the CAUSE CANDIDATES window of the diagnosis screen, then the Frame 7 [vertical black line → photosensitive body/stain] ("V.B.LINE → PS BDY/STN" in FIG. 16) which corresponds to the cause candidate selected by the user is looked up to start searching for secondary cause candidates that may produce the "photosensitive body/stain". The inference part 6 in this case looks into all the frames that contain the EFFECT slot having the same value as that of the CAUSE slot of the Frame 7, or [photosensitive body, state, stain], as described above. In the present case, there is one frame that includes the EFFECT slot having the value [photosensitive body, state, stain], and this frame is the Frame 12 [photosensitive body/stain → cleaning problem] ("PS BDY/STN → CLN PROBLM" in FIG. 21). The inference part 6 therefore selects this Frame 12 [photosensitive body/stain → cleaning problem] and reads out the value of the CAUSE slot as well as the value of the certainty factor included in this frame. In this case, however, the inference part 6 finds the value of the certainty factor of the Frame 12 equal to zero, which shows that the fault inferred is an other-dependency cause having no specific troubleshooting measure for eliminating sources of trouble. Therefore, the value of the CAUSE slot of this frame [cleaning problem, -, -] cannot refer to a specific troubleshooting measure, and this value of the slot of this frame is not worse the displaying on the diagnosis screen.

Then, the inference part 6 ignores this other-dependency cause [cleaning problem, -, -] and searches secondary self-dependency causes at downstream nodes of the search tree. More specifically, the inference part 6 searches for frames that include the EFFECT slot having the value [cleaning problem, -, -] and selects two frames which are the Frame 13 with frame name [cleaning problem → cleaning blade/break] ("CLN PROBLM → CLN BLM/BRK" in FIG. 22) and the Frame 14 with frame name [cleaning problem → fluorescent lamp cover/stain] ("CLN PROBLM → FL CVR/STN" in FIG. 23). These two frames have the certainty factors equal to 1 and 3, respectively, so they are found to be a self-dependency cause that has a specific troubleshooting measure for eliminating sources of trouble. From each of these Frames 13 and 14, the inference part 6 extracts information given within the CAUSE CANDIDATE CRITERIA slot from each of these Frames 13 and 14 stored in the knowledge base 2, and makes a decision as to whether such information includes any event among those in the pretraced nodes of the search tree. In the present case, the value of the CAUSE CANDIDATE CRITERIA slot of the Frame 13 [cleaning problem → cleaning blade/break] ("CLN PROBLM → CLN BLD/BRK" in FIG. 22) is "vertical black line, -, -], while the value of the CAUSE CANDIDATE CRITERIA slot of the Frame 14 [cleaning problem → fluorescent lamp cover/stain] ("CLN PROBLM → FL CVR/STN" in FIG. 23) are [vertical black line, -, -] and [background stain, -, -], and therefore both the CAUSE CANDIDATE CRITERIA slots of these two frames contains information which is the same as the pretraced event of the search tree [vertical black line]. Accordingly, it is determined that both the above described two frames may be a cause candidate to be displayed, and the values of the CAUSE slots thereof, or [cleaning blade, state, break] and [fluorescent lamp cover, state, stain], are taken as the cause candidate displayed on the diagnosis screen. As a result, the two cause candidates described above are displayed as the secondary causes at the CAUSE CANDIDATES window of the diagnosis screen, the secondary causes accompanying the values of the certainty factors. In the present case, for example, [fluorescent lamp cover stain 3] ("FL CVR STN 3") and [cleaning blade break 1] ("CLN BLD BRK 1") appear in this order at the CAUSE CANDIDATES window, as indicated in FIG. 25.

In a different case where the fault being observed with the copying machine is not the vertical black line but the background stain, it is obvious that the [cleaning blade break] is excluded from the cause candidates being displayed, because the CAUSE CANDIDATE CRITERIA slot of the Frame 13 (FIG. 22) does not contain information which corresponds with that of the pretraced event of the search tree [background stain].

As described in the foregoing, the fault diagnosis expert system according to the present invention repeatedly carries out inference of cause candidates with smooth interaction between the user and the system until a bottom-level node of the search tree is found, and it is possible to infer the n-th level depth causes of the machine trouble.

Further, the present invention is not limited to the above described embodiment, and variations and modifications may be made without departing from the scope of the present invention.

What is claimed is:

1. A fault diagnosis expert system for locating and eliminating sources of a machine trouble comprising:

storage means for storing a fault diagnosis expert knowledge constructed in a hierarchical structure of a search tree in which cause-to-effect links connecting high-level effect events to low-level cause events are pre-defined and all possible low-level cause events are pre-enumerated for each high-level effect event, said low-level cause events being candidates for a cause producing said high-level effect events;

user interface means for providing a user with questions and responses concerning state of the machine trouble, allowing the user to supply user information in reply to the questions from the user interface means and allowing the user interface means to provide the user with the responses in reply to the user information;

inference means for inferring a cause of the machine trouble with the fault diagnosis expert knowledge stored in said storage means and the user information supplied from the user; and outputting means for allowing inference results supplied from said inference means to be displayed for the user, wherein the fault diagnosis expert knowledge stored in the storage means includes a cause candidate criterion which is pre-defined as an event used for the inference means to trace back appropriate nodes within the search tree when the inference means infers the cause of the machine trouble to locate a true cause thereof.

2. A fault diagnosis expert system as claimed in claim 1, wherein said inference means checks, during inference of selecting a low-level cause event from a high-level effect event by tracing back nodes through the search tree, whether an event given as the cause candidate criterion with respect to one of the cause-to-effect links being connected between the high-level effect event and the low-level cause event already takes place before the low-level cause event is selected from the high-level effect event, the inference means then making a decision that the high-level cause event is a cause candidate of the low-level effect event only when said event already takes place.

3. A fault diagnosis expert system as claimed in claim 2, wherein a certainty factor is pre-defined for each of the cause-to-effect links within the storage means, said certainty factor indicating the degree of likelihood of the low-level cause event being a cause producing the high-level effect event.

4. A fault diagnosis expert system as claimed in claim 3, wherein said cause-to-effect links pre-defined by said fault diagnosis expert knowledge stored in said storage means have an identifier for indicating a difference between self-dependency causes and other-dependency causes, said self-dependency causes having specific troubleshooting measures for eliminating sources of the machine trouble or preventing occurrence of the machine trouble, said other-dependency causes having no specific troubleshooting measures and being followed by low-level self-dependency causes downstream of said other-dependency cause through the search tree, said low-level self-dependency causes having specific troubleshooting measures for eliminating sources of the machine trouble or preventing occurrence of the machine trouble.

5. A fault diagnosis expert system as claimed in claim 4, wherein said identifier of each of the cause-to-effect events is expressed by a special value of the certainty factor, said inference means checking that the certainty factor of a cause-to-effect link is equal to said special value, and identifying the low-level cause event of the cause-to-effect link as an other-dependency cause.

6. A fault diagnosis expert system for locating and eliminating sources of a machine trouble comprising:

storage means for storing a fault diagnosis expert knowledge constructed in a hierarchical structure of a search tree in which cause-to-effect links connecting high-level effect events to low-level cause events are pre-defined and all possible low-level cause events are pre-enumerated for each high-level effect event, said low-level cause events being candidates for a cause producing said high-level effect events;

user interface means for providing a user with questions and responses regarding state of the machine trouble, allowing the user to supply user information in reply to the questions from the user interface means and allowing the user interface means to provide the user with the responses in reply to the user information;

inference means for inferring a cause of the machine trouble with the fault diagnosis expert knowledge stored in said storage means and the user information supplied from the user; and outputting means for allowing inference results supplied from said inference means to be displayed for the user, wherein the cause-to-effect links pre-defined within the fault diagnosis expert knowledge stored in the storage means have an identifier for indicating a difference between self-dependency causes and other-dependency causes, said self-dependency causes having specific troubleshooting measures for eliminating sources of the machine trouble or preventing occurrence of the machine trouble, said other-dependency causes having no said specific troubleshooting measures and being followed by low-level self-dependency causes downstream of said other-dependency cause through the search tree, said low-level self-dependency causes having said specific troubleshooting measures.

7. A fault diagnosis expert system as claimed in claim 6, wherein a certainty factor is pre-defined for each of the cause-to-effect links within the storage means, said certainty factor indicating degree of likelihood of the low-level cause event being a cause producing the high-level effect event.

8. A fault diagnosis expert system as claimed in claim 7, wherein said identifier of each of the cause-to-effect events is expressed by a special value of the certainty factor, said inference means checking that the certainty factor of a cause-to-effect link is equal to said special value, to identify the low-level cause event of the cause-to-effect link as an other-dependency cause.

9. A fault diagnosis expert system as claimed in claim 8, wherein said inference means, after checking that an inferred cause event is an other-dependency cause, enumerates low-level self-dependency causes downstream of said inferred cause event through the search tree, said inference means making a decision that said low-level self-dependency causes are cause candidates of the machine trouble.

10. A fault diagnosis expert system as claimed in claim 9, wherein some of said cause-to-effect links have supporting conditions for facilitating an inference process of locating a true cause of the machine trouble, said supporting condition being represented by a conditional statement, a positive weight and a negative weight.

11. A fault diagnosis expert system as claimed in claim 10, wherein said positive weight of the supporting condition is added to the certainty factor to increase the value of the certainty factor when the conditional statement is affirmative with respect to the state of the machine observed, while said negative weight is added to the certainty factor to decrease the value of the certainty factor when the conditional statement is negative.

12. A fault diagnosis expert system as claimed in claim 11, wherein said fault diagnosis expert knowledge stored in the storage means includes a cause candidate criterion which is pre-defined as an event used for the inference means to trace back appropriate nodes within the search tree when the inference means infers the cause of the machine trouble to locate a true cause thereof.

13. A fault diagnosis expert system as claimed in claim 12, wherein said inference means checks, during inference of selecting a low-level cause event from a high-level effect event by tracing back nodes through the search tree, whether an event given as the cause candidate criterion with respect to one of the cause-to-effect links being connected between the high-level effect event and the low-level cause event already takes place before the low-level cause event is selected from the high-level effect event, the inference means then making a decision that the high-level cause event is a cause candidate of the low-level effect event only when said event already takes place.

* * * * *